United States Patent
Webb

(10) Patent No.: US 10,172,339 B2
(45) Date of Patent: Jan. 8, 2019

(54) FISH HOOK AND LEADER LINE HOLDING DEVICE

(71) Applicant: Kevin Webb, St. Petersburg, FL (US)

(72) Inventor: Kevin Webb, St. Petersburg, FL (US)

(*) Notice: Subject to any disclaimer, the term of this patent is extended or adjusted under 35 U.S.C. 154(b) by 326 days.

(21) Appl. No.: 15/249,540

(22) Filed: Aug. 29, 2016

(65) Prior Publication Data
US 2018/0055029 A1 Mar. 1, 2018

(51) Int. Cl.
*A01K 97/06* (2006.01)

(52) U.S. Cl.
CPC .................... *A01K 97/06* (2013.01)

(58) Field of Classification Search
CPC ....................................... A01K 97/06
USPC ........................................ 43/57.2
See application file for complete search history.

(56) References Cited

U.S. PATENT DOCUMENTS

| | | | | |
|---|---|---|---|---|
| 335,491 A * | 2/1886 | Wells | A01K 97/06 43/57.2 |
| 595,998 A * | 12/1897 | Garland | A01K 97/06 43/57.2 |
| 2,041,232 A * | 5/1936 | Collins | A01K 97/06 43/57.2 |
| 2,158,947 A * | 5/1939 | Purdum | A01K 91/18 43/27.4 |
| 2,501,443 A * | 3/1950 | Fitzsimmons | A01K 97/06 211/120 |
| 2,631,807 A * | 3/1953 | Witt | A01K 97/06 248/229.15 |
| 2,659,997 A * | 11/1953 | Guestinger | A01K 97/06 211/120 |
| 2,667,010 A * | 1/1954 | Anderson | A01K 97/06 206/315.11 |
| 2,849,829 A * | 9/1958 | Fisher | A01K 91/18 43/57.2 |
| 3,775,894 A * | 12/1973 | Goddard | A01K 91/18 43/57.3 |
| 3,945,144 A * | 3/1976 | Purselley | A01K 91/18 43/57.3 |
| 5,182,878 A * | 2/1993 | Clark | A01K 97/06 43/27.4 |
| 5,386,662 A * | 2/1995 | Vader | A01K 97/06 206/315.11 |
| 5,778,592 A * | 7/1998 | Malmberg | A01K 97/10 43/21.2 |
| 5,983,556 A * | 11/1999 | Zaloga | A01K 97/06 211/105.1 |
| 6,122,858 A * | 9/2000 | Beaston | A01K 91/18 43/57.3 |
| 7,043,869 B1 * | 5/2006 | Hubbard | A01K 97/10 43/21.2 |
| 7,284,349 B1 * | 10/2007 | Sala | A01K 97/06 43/57.2 |
| 7,997,024 B2 * | 8/2011 | Gesik | A01K 97/06 43/54.1 |

(Continued)

*Primary Examiner* — Christopher P Ellis
(74) *Attorney, Agent, or Firm* — Larson & Larson, P.A.; Justin P. Miller; Frank Liebenow

(57) ABSTRACT

The disclosed device is a fish hook and leader line holder for use when fishing. A cross member includes penetrations for fishing hooks, allowing the associated leader lines to hang. A vertical member supports the cross member and interfaces with a fishing pole holder. An optional stabilization member affixes to the leader lines to ensure separation is maintained.

7 Claims, 4 Drawing Sheets

(56) References Cited

U.S. PATENT DOCUMENTS

| | | | |
|---|---|---|---|
| 8,800,788 B1* | 8/2014 | Guidry | A01K 97/10 |
| | | | 211/70.8 |
| 9,932,094 B1* | 4/2018 | Santeiro | B63B 25/002 |
| 2003/0182845 A1* | 10/2003 | Pfeffer | A01K 97/06 |
| | | | 43/57.1 |
| 2004/0074136 A1* | 4/2004 | Moss | A01K 97/06 |
| | | | 43/57.1 |
| 2009/0119974 A1* | 5/2009 | Rieux | A01K 97/06 |
| | | | 43/54.1 |
| 2012/0131844 A1* | 5/2012 | Taylor | A01K 97/06 |
| | | | 43/54.1 |
| 2013/0145678 A1* | 6/2013 | Bosch | A01K 97/06 |
| | | | 43/57.2 |
| 2015/0096221 A1* | 4/2015 | Marek | A01K 97/06 |
| | | | 43/54.1 |

\* cited by examiner

FISH HOOK AND LEADER LINE HOLDING DEVICE

FIELD

This invention relates to the field of fishing products and more particularly to a device to prevent tangling of fish hook leader lines.

BACKGROUND

Fishing for sport or pleasure is a popular hobby. With the wide variety of locations in which one can fish, and the many breeds of sport fish, the equipment required is varied.

Included within the varied equipment are leaders, or leader lines. A leader is a length of wire or fishing line attached to the end of the primary line. The primary line is the fishing line that is wound around the reel and run along the rod, then connected to the leader line.

The leader line has two ends. To the first end a user attaches fishing rigs, lures, hooks, and other items that are intended to attached or catch a fish. On the second end, or opposite end, the user attaches a mechanism such as a clip in order to connect the leader line to the primary line, or the user may knot the leader line to the primary line.

Leader lines serve two primary purposes. The first purpose is protection of the primary line. The leader line protects the primary line from the teeth of the fish, or environmental hazards such as rocks and shells.

The second purpose is visibility. Certain types of fishing line are visible underwater and may repel fish. Despite this, at times these visible fishing lines may be desirable for reasons of buoyancy, durability, or cost. By pairing the visible primary line with a leader of a material that is invisible underwater, the fish will see only the lure or bait.

Just as with primary lines, leader lines may be constructed of different materials, including fluorocarbons and stainless steel wire. Additionally, leader lines are available in different designs for different purpose, such as casting or trolling.

As a result of these varied options a given fisherman often has many leader lines at a given time. Keeping the leaders organized, readily accessible, and untangled is difficult. What is needed is a device that can store leader lines in a manner that allows for ready use, but without creating tangled leader lines.

SUMMARY

The disclosed device is a fish hook and leader line holder for use when fishing. The device is constructed of two primary members. The first member inserts into a rod holder. A rod holder is an open tube with a locking member at its bottom, often a bolt.

In order to fit into the most common rod holder shapes, the first member is generally circular.

The second member sits atop the first member, opposite the end that enters the rod holder. The second member and first member may be directly abutted to one another using multiple types of joints, including a saddle joint, fishmouth joint, or a mortise and tenon joint wherein the first member penetrates the second member. Alternatively, the second and first members are connected using a third component, a tee. If a tee is used the second member may be split into two pieces, one for each side of the tee, with the second member for insertion into the bottom of the tee.

The second member, or upper member, includes a multiplicity of penetrations on its upper half. Each penetration is shaped to accept the pointed end of a fishhook. The intention is that a user can hang each leader line with the fishhook end up and the remaining line dangling from the hook. By keeping each hook separate the chances of tangling the lines is minimized.

Additionally, the pointed end of the hook is shielded. This protects the hook, keeping the tip from unnecessary exposure to the elements, and the user, who is protected from being accidently caught by his own hook.

Allowing the leader lines to hang, rather than requiring wrapping of the leader lines around one of the members, avoids the problem of creating a memory in the line. If fishing line is held in a particular position for an extended length of time the line may develop a memory. For example, if the line is held in a curved position, the line may remain curved even when removed from the device that is holding it in a curved position. The behavior of fishing line is important to its operation. Thus allowing the leader line to hang in a straight position, which is the ideal shape for the eventual use, avoiding the issue of memory.

Each penetration may merely be a hole in the secondary member, or a hole that is lined with a metal ring or eyelet in order to increase toughness.

While the disclosed device may be made in many sizes, certain sizes are preferable. For example, the first member, which is inserted into the rod holder, has an ideal length of between 12-24 inches with a diameter of 0.75 to 1.25 inches.

The end of the first member that is inserted into the rod holder includes an anti-rotation notch. The notch is ideally between 0.25 and to 0.375 inches in width, and 0.25 and 1 inches in depth.

The second member, which is attached to the top of the first member, has an ideal length of 9 to 24 inches with a diameter of 0.75 to 1.25 inches.

The penetrations in the second member have an ideal diameter of 0.25 to 0.5 inches. The number of penetrations may vary depending on the size of each penetration and the desired spacing. The preferred embodiment includes ten penetrations with center-to-center spacing of one inch.

An optional stabilization member is affixed below the second member. The stabilization member interfaces with the flexible portion of the leader line, providing an additional guard against tangling of the leader line in a generally parallel arrangement.

The stabilization bar is constructed from a semi-rigid material, such as a foam or soft plastic. A vertical groove or channel in the stabilization bar interfaces with each leader line, keeping the adjacent leader lines from interfering with each other. The vertical grooves or channels are optionally lined in a tacky material to prevent the leader lines from being inadvertently disconnected from the stabilization bar.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
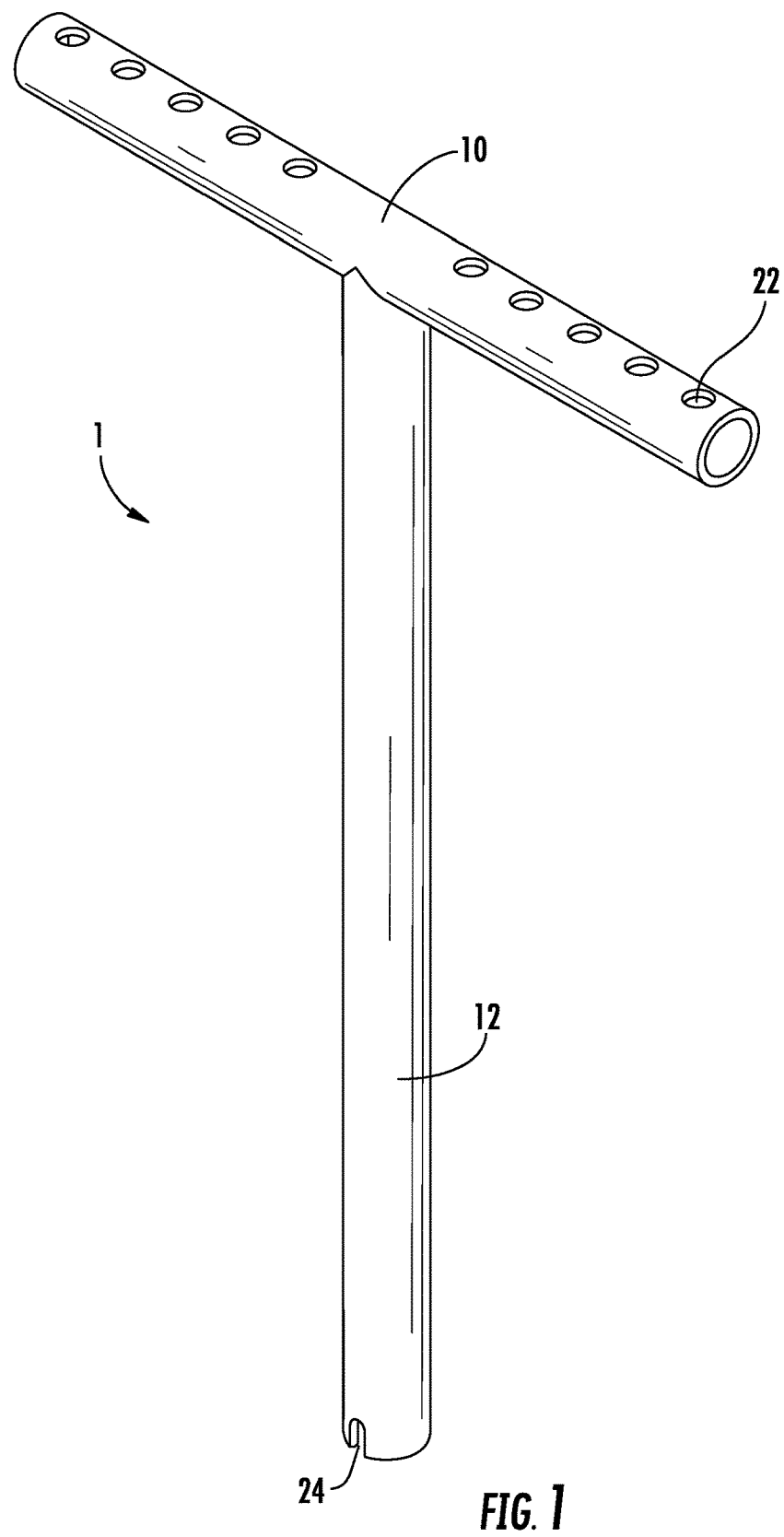
FIG. 1 illustrates a first embodiment of the Fish hook and leader line holding device.

Reference will now be made in detail to the presently preferred embodiments of the invention, examples of which are illustrated in the accompanying drawings. Throughout the following detailed description, the same reference numerals refer to the same elements in all figures.

Referring to FIG. 1, a first embodiment of the Fish hook and leader line holding device is shown. The leader line storage device 1 is shown, with primary components of a cross member 10 connected at a substantially right angle to vertical member 12.

Cross member 10 includes a plurality of hook penetrations 22 to hold the pointed end of fish hooks.

The bottom of vertical member 12 includes an anti-rotation slot 24 that interfaces with the bolt present at the bottom of most fishing pole holders. This interface prevents the leader line storage device 1 from inadvertently rotating.

Figure 2:
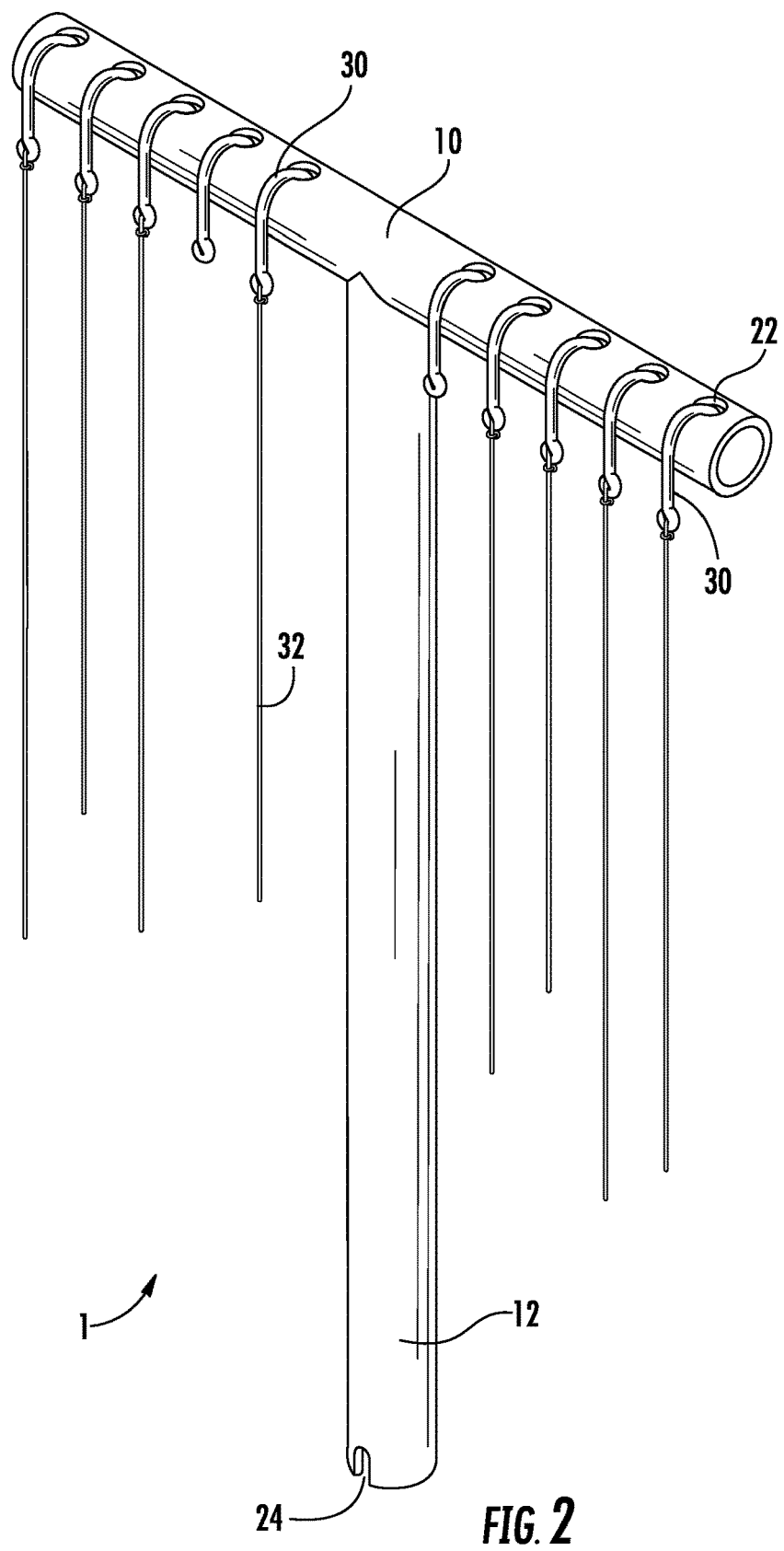
FIG. 2 illustrates the first embodiment with hooks and leader lines.

Referring to FIG. 2, the first embodiment of the device with hooks and leader lines is shown.

Multiple hooks 30 are shown inserted into the hook penetrations 22. Also shown are leader lines 32 connected to the hooks 30 in the background.

Figure 3:
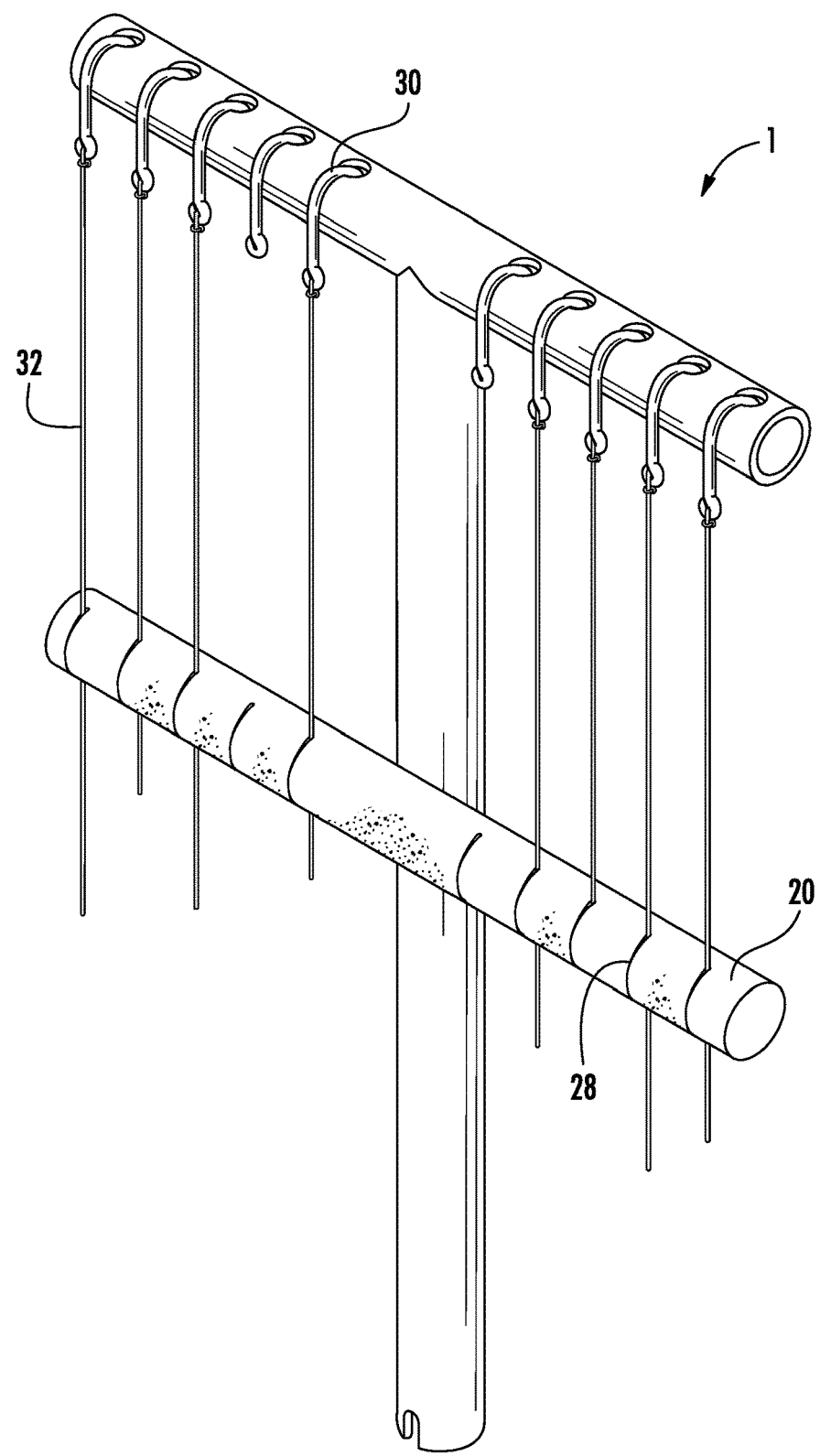
FIG. 3 illustrates the first embodiment with a stabilization member.

Referring to FIG. 3, the first embodiment of the device with a stabilization member is shown.

The stabilization member 20 interfaces with the leader lines 32, maintaining separation between the leader lines 32. The stabilization member 20 includes retention channels 28 that grip the leader lines 32. The stabilization member 20 is optionally secured to the vertical member 12.

Figure 4:
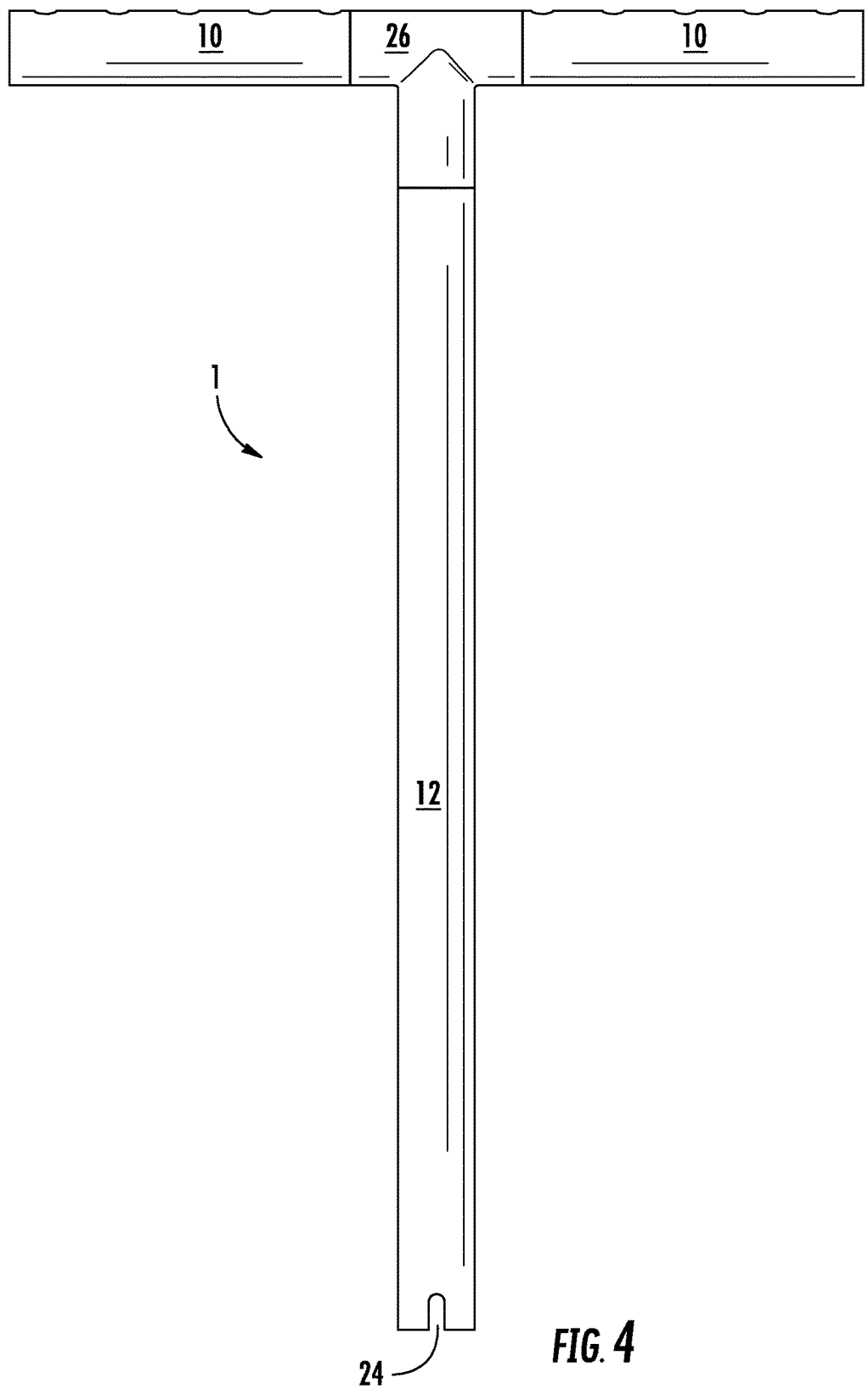
FIG. 4 illustrates a second embodiment.

Referring to FIG. 4, a second embodiment of the device is shown.

Again shown is the leader line storage device 1 with cross member 10 and vertical member 12.

In this embodiment the cross member 10 is connected to the vertical member 12 by a tee fitting 26.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A device to prevent fishing hooks with leader lines from becoming tangled, the device comprising:
   a cross member;
      the cross member including hook penetrations;
      whereby fishing hooks are inserted into the hook penetrations, allowing leader lines affixed to the fishing hooks to hang freely while maintaining separation;
   a stabilization member;
      the stabilization member having multiple vertical slots;
      the multiple vertical slots adapted to grip leader lines, thereby further preventing leader lines from entangling.

2. The device of claim 1, further comprising:
   a vertical member;
      the vertical member affixed to the cross member at a center of the cross member;
      the vertical member substantially perpendicular to the cross member.

3. The device of claim 2, wherein:
   the stabilization member has a cylindrical shape.

4. The device of claim 2, further comprising:
   an anti-rotation slot;
      the anti-rotation slot incorporated into the vertical member;
      whereby the anti-rotation slot interfaces with a bolt in a fishing pole holder and preventing rotational movement of the cross-member.

5. A device for preventing fishing line affixed to fishing hooks from becoming tangled, the device comprising:
   a vertical member having a top and a bottom;
   a horizontal member;
      the horizontal member attached to the top of the vertical member;
      the horizontal member including multiple holes into which fishing hooks are to be inserted, maintaining separation between the fishing line affixed to the fishing hooks, thereby preventing tangling;
   the bottom of the vertical member including an anti-rotation slot that interfaces with the bottom of a fishing pole holder on a boat;
   a stabilization member;
      the stabilization member of a cylindrical shape, having multiple vertical slots;
      the multiple vertical slots adapted to retain fishing lines, thereby further preventing tangling.

6. The device of claim 5, wherein the stabilization member is affixed to the vertical member.

7. A device to prevent entangling of fishing lines, the device comprising:
   a cross member for interfacing with fishing hooks;
      the cross member including multiple penetrations for the insertion of fishing hooks;
      the fishing hooks affixed to leader lines;
   a vertical member for raising the height of the cross member;
      the vertical member adjoining the cross member at a substantially right angle;
      the vertical member having an anti-rotation slot intended to interface with a fishing pole holder;
   a stabilization member for maintaining leader line separation;
      the stabilization member affixed to the vertical member at a substantially right angle and below the cross member;
      the stabilization member including one or more retention channels inside which leader lines may be held.

* * * * *